United States Patent [19]
Muir et al.

[11] Patent Number: 6,088,515
[45] Date of Patent: *Jul. 11, 2000

[54] METHOD AND APPARATUS FOR MAKING A HYPERMEDIUM INTERACTIVE

[76] Inventors: Jeff Muir, 3114 SW. 20th Terr., Apt. No. B-2, Delray Beach, Fla. 33445; Andrew L. Stergiades, 3098 NW. 27th Ave., Boca Raton, Fla. 33434

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,623

[22] Filed: Nov. 13, 1995

[51] Int. Cl.$^7$ .............................. G06F 13/38; G06F 15/17
[52] U.S. Cl. ................................ 395/200.47; 395/200.33
[58] Field of Search ...................... 395/200.12, 200.09, 395/326, 762, 610, 200.32, 200.33, 200.47, 200.48, 200.57; 379/96, 93.25; 345/326; 707/501, 513, 10

[56] References Cited

U.S. PATENT DOCUMENTS

| | | | |
|---|---|---|---|
| 5,414,457 | 5/1995 | Kadowaki | 379/96 |
| 5,530,852 | 6/1996 | Meske, Jr. et al. | 395/200.09 |
| 5,537,546 | 7/1996 | Sauter | 395/762 |
| 5,561,769 | 10/1996 | Kumar et al. | 395/200.32 |
| 5,572,643 | 11/1996 | Judson | 395/762 |
| 5,579,469 | 11/1996 | Pike | 395/326 |
| 5,606,493 | 2/1997 | Duscher et al. | 395/200.32 |
| 5,623,656 | 4/1997 | Lyons | 395/200.09 |
| 5,701,451 | 12/1997 | Rogers et al. | 395/200.48 |
| 5,710,918 | 1/1998 | Lagarde et al. | 707/10 |

OTHER PUBLICATIONS

Putz, S. "Interactive information services using Word–Wide Web hypertext", *Computer Networks and ISDN Systems*, Elsevier Science B.V., vol. 27, pp. 273–280, 1994.

Hoff, A. "Java and Internet Programming", *Dr. Dobb's Journal*, pp. 56,58, 60–61 and 101–102, Aug. 1995.

T. Tessier; *Dr. Dobb's Journal*; "Using Javascript to Create Interactive Web Pages A Cross–Platform Object Scripting Language"; 21, No. 3:84–97 (Mar. 1, 1996).

A. Singleton; *Byte*; "Wired On The Web"; 21 No. 1:77–78, 80 (Jan. 1, 1996).

P. Davis; *Database*; "An Interactive Hypermedia Map Viewer"; 18, No. 2:65–67 (Apr./May, 1995).

J.M. Chu et al.; *Behavior Research Methods, Instruments & Computers*; "Creating a Hypertext Markup Language Documents for an Information Server", 27, No. 2:200–205 (Jan. 1, 1995).

*Primary Examiner*—Mark H. Rinehart
*Attorney, Agent, or Firm*—Testa, Hurwitz & Thibeault, LLP

[57] ABSTRACT

A system and method of making a hypermedium page interactive. In one embodiment the system includes a hyperlink on the hypermedium page displayed on a client node; a hyperlink configuration file (corresponding to the hyperlink on the client node) located on a network server node; and a client agent located on the client node. In response to a user selecting the hyperlink on the hypermedium page, the client agent establishes a communications link from the client agent to an application execution server agent on an application server using the information located in the configuration file obtained from the network server node. In response to the creation of the communications link between the application execution server agent and the client agent, the application executes on the application execution server and the user is capable of interactively using the application running on the application execution node from the client node. Data input and display occurs at the client node under the control of the client agent.

13 Claims, 2 Drawing Sheets

METHOD AND APPARATUS FOR MAKING A HYPERMEDIUM INTERACTIVE

FIELD OF THE INVENTION

The invention relates generally to the field of computer communications and more specifically to the field of remote application processing.

BACKGROUND OF THE INVENTION

A hypermedium is a graphical display which contains a series of graphic and textual images which are referred to as hyperlinks. Each hyperlink typically corresponds to additional information which is available to a user of the hypermedium. For example a hypermedium display might be an encyclopedic article about flight. If the graphical display of the article includes a picture of a rocket, and if the user is able to obtain information about the engine of the rocket by selecting (typically by using a pointing device referred to as a computer mouse) a portion of the display showing the engine, the portion of the picture containing the rocket engine is referred to as a hyperlink. That is, the portion of the picture containing the engine is a link to information about the engine. The activation of a hyperlink causes the hypermedium to request a data file of the desired information from the program actually controlling the hypermedium.

When a hypermedium is used in conjunction with a network, for example the world wide web or the internet, a user on a client node on the network first accesses what is termed a home page or a web page. This home page or web page is obtained from another node on the net, termed a network server, and is displayed on the client node by a program termed a network browser or web browser. In such a case, when the user selects the hyperlink (in the previous example, the portion of the display showing the rocket engine) a request is made to the network browser for the data file containing the requested information. The network browser on the user's node establishes communication with the network node, the data server, having data corresponding to the requested hyperlink. In this case the node having information about the rocket engine contains the information required by the hyperlink.

Although hypermedium has been used to transfer information to a user in the manner just discussed, it is desirable to be able to use a hypermedium display to interactively execute applications such as database programs located on another computer, an application execution server, on the network. The present invention relates to a method and apparatus to accomplish this task.

SUMMARY OF THE INVENTION

The invention relates to a system of making a hypermedium page interactive to thereby permit an application to be executed on one node and the results displayed and data entered on another node. In one embodiment the system includes a client node, a network server node and an application execution server node interconnected by a communication link. A hyperlink on the hypermedium page is displayed on the client node and a hyperlink configuration file (corresponding to the hyperlink on the client node) is located on the network server node. In one embodiment, a client agent is located on the client node and a server agent is located on the application execution server node. A communication link is created by the client agent between the client agent on the client node and the server agent on the application execution server node in response to data in the hyperlink configuration file. The system also includes an application on the application execution server node which executed on the application execution server node in response to the communications link between the client agent and the server agent. The application running on the application execution node then communicates with the client agent through the server agent. The client agent on the client node is responsible for receiving data input from the user and transferring the data to the application on the application execution node and receiving data from the application on the application execution node and displaying data output to the user on the client node.

The invention also relates to a method of making a hypermedium page interactive. The method includes the steps of selecting a hyperlink on the hypermedium page displayed on a client node; retrieving (from a server node to the client node) a hyperlink configuration file corresponding to the hyperlink and starting a client agent on the client node. The method further includes the steps of creating a communications link between a server agent on an application execution server and the client agent; starting the application on the application execution server in response to the connection; communicating data between the client agent on the client node and application on the application execution node; and managing the display and input of data on the client node.

BRIEF DESCRIPTION OF THE DRAWINGS

Other features and benefits of the invention can be more clearly understood with reference to the specification and the accompanying drawings in which.

DETAILED DESCRIPTION OF THE INVENTION

Figure 1:
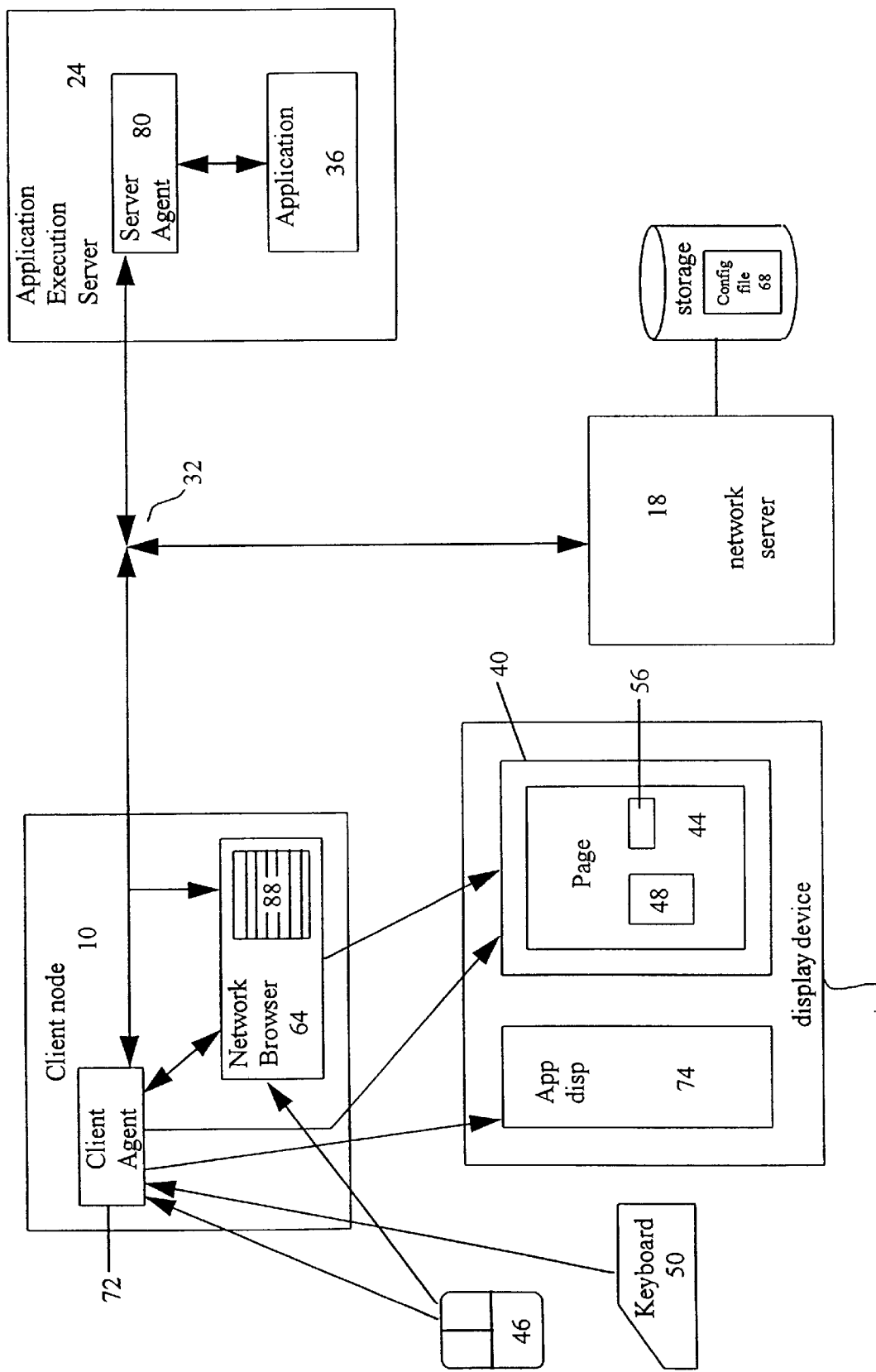
FIG. 1 is a block diagram of an embodiment of the system of the invention.

Referring to FIG. 1, and in brief overview, an embodiment of an interactive hypermedium system of the invention includes a client node 10, a network server node 18 and an application execution server node 24 interconnected by a communications link 32, herein referred to without any loss of generality as a network or web. Although only one client node 10, network server node 18 and application execution server node 24, are shown in FIG. 1 for clarity, an actual network may include many such nodes. Alternatively, the services provided by each of the nodes listed may be combined in one or more nodes. For example, the application execution server and the network server may in fact be the same node. In the extreme it is possible for all functions to be performed by the same node, although such would not typically be the case. In addition, although only one application 36 is shown on the application execution server 24, in reality, an application execution server node 24 typically includes many applications 36. Each node on the network or web 32 includes a processor, which may vary significantly from other processors on the web 32 in terms of computing power and associated hardware. Further, the applications 36 available for execution on each node may be different.

A user on a client node wishing to run the application program 36 which is located on the application execution server 24 on the web 32 does so through a graphical user interface 40, which is herein referred to without any loss of generality as a hypermedium, located on the client node 10.

The graphical interface is displayed on a graphical display device 42. Data is entered by the users through a mouse 46 and a keyboard 50 located on the client node 10. The graphical display or page 44 which the user first views on the hypermedium 40 is referred to herein without any loss of generality as the home page or web page of the application 36. A page 44 or home page of the hypermedium 40 includes a graphic link 48 or textual link 56 herein referred to without any loss of generality as a hyperlink. The web page is displayed by a process 64 referred to herein without any loss of generality as a network browser 64 executing on the client node 10.

The network browser 64 obtains the first page or web page 44 from a network server node 18 and displays the web page 44 on the hypermedium 40 for the user to view on the graphical display device 42. When the user selects an application program 36 to execute (by selecting a graphical 48 or textual 56 hyperlink using the mouse 46 or keyboard 50) the network browser 64 obtains a network configuration file 68 corresponding to the selected application 36 from a predetermined network server 18 and starts a client agent 72 which will communicate with the selected application 36. This will be discussed in more detail below.

The client agent 72 reads the configuration file 68 and establishes a communications link to a server agent 80 on the application execution server 24 specified by the configuration file 68. In one embodiment, the configuration file 68 includes the name of the application and the node location of the application 36 corresponding to the hyperlink 48, 56. The configuration file may also contain optional information such as authentication or authorized user information. Server agent 80 performs the operations necessary (such as authentication) to permit the client agent 72 access to the application 36, and once access is permitted, starts the application 36 requested by the user. Once the application 36 is executing on the application execution server, the application 36 communicates through the server agent 80 directly with the client agent 72 without intervention by the network browser 64. The client agent 72 is then responsible for receiving data from the user through the mouse 46 and keyboard 50 and transmitting it to the application program 36 on the application execution server 24. Similarly, the client agent 72 is responsible for receiving data from the application 36 on the application execution server 24 and displaying the data in an application display window 74 on the graphical display device 42 on the client node 10. It should be noted that the application display window 74 may be located within the boundaries or outside the boundaries of the hypermedium 40. When the application 36 is completed the server agent 80 instructs the client agent 72 to disconnect the communication link 32 between the client agent 72 and the server agent 80 and the server agent waits for the next connection.

Figure 2:
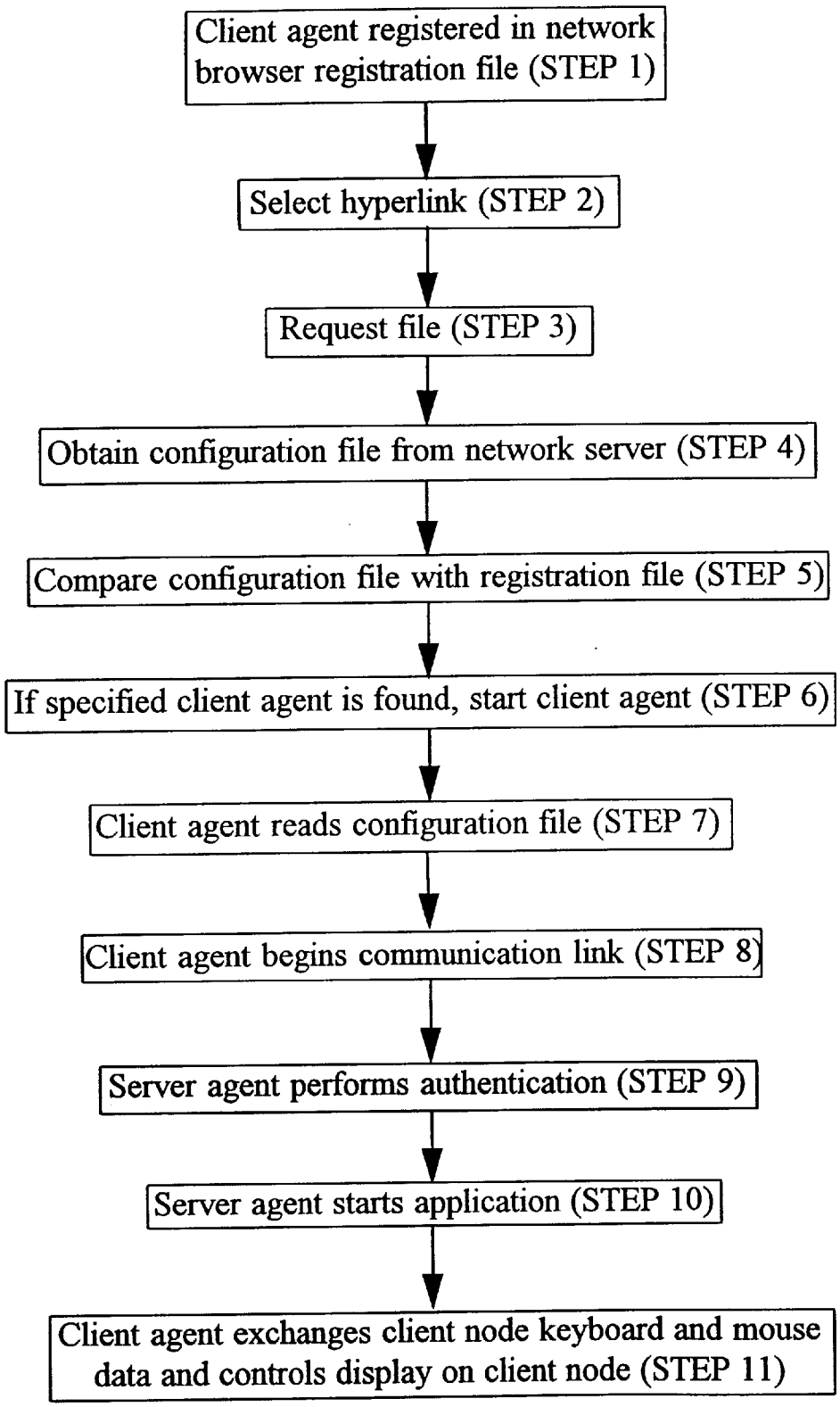
FIG. 2 is a flow chart of the operation of system of the invention shown in FIG. 1.

FIG. 2 depicts the operation of the system in more detail. Initially, the client agent 72 is registered (Step 1) with the network browser 64 of the client node 10 and an entry is made in the network browser's registration file 88 (FIG. 1). This entry permits the network browser 64 to start the client agent 72 whenever a given file type is requested by the hyperlink 48, 56 of the hypermedium 40. In this case the client agent 72 is designed to permit a user on the client node 10 to execute and interact with a remote application 36 on an application execution server node 24. The client agent 72 would be registered with the network browser 64 such that whenever a hyperlink 48, 56 requested the given file type (for example .RMT for remote execution) from the network browser 64, the network browser 64 would start the client agent 72 which would permit remote execution and interaction with an application 36 resident on an application execution server 24. The invoking of the client agent 72 is discussed in more detail below.

Next, when a user wishes to execute an application from a hypermedium environment, for example a database program, the hypermedium 40 is displayed in a manner that is well known to those skilled in the art. When the user selects a hyperlink 48, 56 on the page 44 of the hypermedium (Step 2) by using the mouse 46 or keyboard 50 on the client node 10, a request is made to the network browser 64 for the corresponding data file (Step 3). In this example, the filetype (.RMT) is requested.

The network browser 64 obtains the corresponding configuration file 68 from the network server 18 which is specified in the file request made by the hyperlink 48, 56 to the network browser 64 (Step 4). The network browser 64 then compares the obtained configuration file 68 with the registration file 88 of client agent names which it maintains (Step 5). If the client agent 72 specified by the configuration file 68 is found in the registration file 88, the client agent 72 is started (Step 6).

The invoked client agent 72 reads the configuration file 68 (Step 7), and based upon the information in the configuration file 68, begins to establish a communication link with the server agent 80 on the application execution server 24 (Step 8), in this case the sales database application execution server (generally 24).

Considering the process of beginning the communications link of step 8 (FIG. 2) in more detail, communication begins with the server agent 80 monitoring communication activity on the network 32. At this point, no protocol assumptions are made by the server agent 80 beyond those necessary for the transport layer. Similarly, the client agent 72 also makes no assumption of the communications protocol beyond that required by the transport layer. Once the server agent 80 determines that a client agent 72 is attempting to communicate with it, the server agent 80 transmits a message to the client agent 72 indicating that service is available.

Once the client agent 72 determines that service is available on the application execution server node 24, the client agent 72 transmits a message to the server agent 80 indicating that it is ready to proceed with the communication protocol. Once the server agent 80 has responded that it to is ready to continue the communication protocol, the client agent 72 enables the protocol necessary for it to run the application 36. In response to the message from the client agent 72, the server agent 80 also enables the required protocol. The server agent 80 then transmits a message using the required protocol indicating that the client agent's request has been received and accepted.

In response the client agent 72 and the server agent 80 exchange a set of messages which negotiate the parameters under which communications will occur. Once negotiations are complete, the client agent 72 and the server agent 80 are able to communicate as necessary for the application 36 to be run by the user.

Once the communications protocol has been established and the server agent 80 has authenticated the client agent 72 (Step 9) (for example determining that the user has permission to read and write to the database) the application 36 (Step 10) is run on the application execution server 24. At this point application 36 running on the application execution server 24 is communicating via the server agent 80 with the client agent 72 on the client node 10. The client agent 72 is now responsible for transmitting data input by the user using the mouse 46 and keyboard 50 to the application 36 running on the application execution server 24. Further, the client agent 72 is responsible for receiving data for display from the application 36 and displaying that data in the application window 74 on the graphical display device 42 of the client node 10.

It should be noted that the underlying presentation protocol which passes data to a transport layer such as TCP/IP must be capable of transferring graphical information. Examples of such protocols which may be used for interactive hypermedia communication include public domain X-WINDOWS protocol and the proprietary ICA protocol of Citrix Systems Inc.

Thus the above described system permits a user on a client node 10, which may have very limited resources, to start and interact with an application program 36 located on another application execution server node 24. The application 36 then runs on the application execution server node 24 and the data is input and the results displayed on the client node 10.

These and other examples of the concept of the invention illustrated above are intended by way of example and the actual scope of the invention is to be determined solely from the following claims.

What is claimed is:

1. A method of making a hypermedium page interactive, the hypermedium page displayed by a network browser, comprising the steps of:

selecting a hyperlink on the hypermedium page displayed on a client node, the hyperlink providing a link to an executable application;

retrieving a hyperlink configuration file, from a network server to the client node, the hyperlink configuration file corresponding to the hyperlink and identifying a server that executes the application;

starting a client agent on the client mode;

creating by the client agent a communication link to the application execution server identified by the hyperlink configuration file;

starting the identified application on the application execution server in response to the communication link; and receiving, by the client agent, output data from the application executing on the application execution server and displaying on the client node the received output data without intervention by the network browser.

2. The method of claim 1 further comprising the step of displaying the output data from the application in an application display window on the client node.

3. The method of claim 1 further comprising the step of obtaining a hypermedium page from a network server prior to the step of selecting a hyperlink on the hypermedium page.

4. The method of claim 1 further comprising the step of starting a server agent on the application execution server prior to creating the communication link.

5. The method of claim 1 wherein the communications link uses a graphical presentation protocol.

6. A system of making a hypermedium page interactive, the hypermedium page displayed by a network browser, comprising:

a client node;

a hyperlink on said hypermedium page displayed on said client node;

a network server node, in communication with said client node;

a hyperlink configuration file on said server node, said configuration file corresponding to said hyperlink on said client node;

a client agent on said client node;

an application execution server node in communication with said client node and said network server node, said application execution server hosting an executable application;

a server agent on said application execution server node;

said client agent establishing a communications link with said server agent, in response to said configuration file, said application running in response to said communications link between said client agent and said server agent; and said client node displaying output data received from said executable application without intervention by the network browser.

7. The system of claim 6 wherein said client agent displays output data received from said executable application on said client node in an application display window located at said client node.

8. The system of claim 6 further comprising a process obtaining said hypermedium page from said network server and providing said hypermedium page to said client node.

9. The system of claim 6 wherein said hyperlink configuration file comprises:

an application name corresponding to said hyperlink; and an application server address corresponding to said hyperlink.

10. The system of claim 2 wherein the application display window is located within the boundaries of the hypermedium page.

11. The system of claim 2 wherein the application display window is located outside the boundaries of the hypermedium page.

12. The system of claim 7 wherein the application display window is located within the boundaries of the hypermedium page.

13. The system of claim 7 wherein the application display window is located outside the boundaries of the hypermedium page.

* * * * *

UNITED STATES PATENT AND TRADEMARK OFFICE
CERTIFICATE OF CORRECTION

PATENT NO. : 6,088,515
DATED : July 11, 2000
INVENTOR(S) : Muir et al.

It is certified that error appears in the above-identified patent and that said Letters Patent is hereby corrected as shown below:

Title Page,
Item [73], the Assignee should be inserted to read as follows:

--Citrix Systems, Inc., Ft. Lauderdale, FL"--

Signed and Sealed this

Thirty-first Day of July, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,088,515
DATED : July 11, 2000
INVENTOR(S) : Muir et al.

It is certified that error appears in the above-identified patent and that said Letters Patent is hereby corrected as shown below:

Column 6,
Line 43, delete "system" and replace it with -- method -- so that the claim reads as follows:

The method of claim 2 wherein the application display window is located within the boundaries of the hypermedium page.

Column 6,
Line 46, delete "system" and replace it with -- method -- so that the claim reads as follows:

The method of claim 2 wherein the application display window is located outside the boundaries of the hypermedium page.

Signed and Sealed this

Twentieth Day of November, 2001

Attest:

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,088,515
DATED : July 11, 2000
INVENTOR(S) : Muir et al.

It is certified that error appears in the above-identified patent and that said Letters Patent is hereby corrected as shown below:

Column 6,
Line 43, delete "system" and replace it with -- method -- so that the claim reads as follows:
10. The method of claim 2 wherein the application display window is located within the boundaries of the hypermedium page.

Column 6,
Line 46, delete "system" and replace it with -- method -- so that the claim reads as follows:

11. The method of claim 2 wherein the application display window is located outside the boundaries of the hypermedium page.

Signed and Sealed this

Sixteenth Day of April, 2002

Attest:

JAMES E. ROGAN
*Director of the United States Patent and Trademark Office*

*Attesting Officer*